US005719260A

United States Patent [19]
Van Der Heide

[11] Patent Number: 5,719,260
[45] Date of Patent: Feb. 17, 1998

[54] THERMOSET RESIN

[75] Inventor: Evert Van Der Heide, Amsterdam, Netherlands

[73] Assignee: Shell Oil Company, Houston, Tex.

[21] Appl. No.: 731,785

[22] Filed: Oct. 18, 1996

[30] Foreign Application Priority Data

Oct. 18, 1995 [EP] European Pat. Off. ............ 95202822

[51] Int. Cl.$^6$ .................................................. C08F 6/00
[52] U.S. Cl. ..................... 528/481; 528/481; 528/491; 528/493; 528/503; 522/4; 522/5; 522/71; 522/74; 522/162; 522/178
[58] Field of Search ......................... 528/481, 491, 528/493, 503; 522/4, 5, 71, 74, 162, 178

[56] References Cited

U.S. PATENT DOCUMENTS 2,441,082  5/1948  Pinkney ................................. 528/392

FOREIGN PATENT DOCUMENTS

| 32602 | 7/1981 | European Pat. Off. . |
| 121965 | 10/1984 | European Pat. Off. . |
| 181014 | 5/1986 | European Pat. Off. . |
| 372602 | 6/1990 | European Pat. Off. . |

*Primary Examiner*—Samuel A. Acquah

[57] ABSTRACT

A process is provided comprising crosslinking of a derivative of a linear alternating copolymer of carbon monoxide and one or more olefinically unsaturated compounds, which copolymer has a ratio of weight average molecular weight to number average molecular weight of more than 1, and which derivative is obtainable by treating the linear alternating copolymer with formaldehyde and/or a precursor of formaldehyde, a thermoset resin obtainable by such process and a coating based on such thermoset resin.

5 Claims, No Drawings

THERMOSET RESIN

FIELD OF THE INVENTION

The present invention relates to a process comprising crosslinking of a derivative of a linear alternating copolymer of carbon monoxide and one or more olefinically unsaturated compounds, to a thermoset resin obtainable by such process and to a coating based on such thermoset resin.

BACKGROUND TO THE INVENTION

EP-A-372602 relates to thermoset resins which are obtained by curing a linear alternating copolymer of carbon monoxide and one or more olefinically unsaturated compounds in the presence of from 0.1 to 10 mole of curing agent per mole of polymer. In Example C, a linear alternating copolymer of carbon monoxide and propene was subjected to a heat treatment in the absence of a curing agent. The coating obtained was black and brittle. In Example 1, a polyalcohol derivative of the polyketone was subjected to a heat treatment in the absence of a curing agent. The thermoset coating had a light brown color.

U.S. Pat. No. 2,441,082 relates to thermoset resins obtained by treating a monoolefin/carbon monoxide polymer with a basic alkali metal or alkaline earth metal compound, and subsequently blending the treated polymer with formaldehyde. The alkali-treated polymer is described to be yellow. The formaldehyde treated polymer, and crosslinked products derived from it, will be yellow to brown. It is thought that this is due to the separate treatments with alkali and with formaldehyde, giving a substituted cyclopentenone before further reaction with formaldehyde. Furthermore, the monoolefin/carbon monoxide polymers described in U.S. Pat. No. 2,441,082 have physical and chemical properties which are quite different from the linear alternating copolymers of the present invention, as they should be looked upon as polyolefins having a relatively small number of carbonyl groups randomly dispersed in the polymer backbone.

SUMMARY OF THE INVENTION

It has now been found that it is possible to crosslink a derivative of a linear alternating copolymer of carbon monoxide and one or more olefinically unsaturated compounds, which copolymer has a ratio of weight average molecular weight to number average molecular weight of more than 1, without having to add a curing agent while obtaining a clear and white thermoset resin. A curing agent is a compound containing two or more functional groups which during crosslinking are able to react with the derivative of the linear alternating copolymer of carbon monoxide and one or more olefinically unsaturated compounds.

The present invention relates to a process comprising: crosslinking of a derivative of a linear alternating copolymer of carbon monoxide and one or more olefinically unsaturated compounds, which copolymer has a ratio of weight average molecular weight to number average molecular weight of more than 1, and which derivative is obtainable by treating the linear alternating copolymer with formaldehyde and/or a precursor of formaldehyde, which crosslinking process is carried out in the presence of less than 0.1 mole of curing agent per mole of derivative. Preferably, the derivative is crosslinked by heating the derivative to a temperature of between 100° and 300° C. for between 0.001 and 30 hours, and/or subjecting the derivative to ultraviolet light and/or subjecting the derivative to an electron beam. Most preferably, the derivative is crosslinked by heating.

The number and weight average molecular weights are determined according to ASTM D 3536-91.

The present invention also relates to thermoset resin based on a linear alternating copolymer of carbon monoxide and one or more olefinically unsaturated compounds, which copolymer has a ratio of weight average molecular weight to number average molecular weight of more than 1, which resin is obtainable by treating the copolymer with formaldehyde and/or a precursor of formaldehyde and subsequently crosslinking the treated copolymer in the presence of less than 0.1 mole of curing agent per mole of derivative.

The linear alternating copolymers of carbon monoxide and one or more olefinically unsaturated compounds, will hereinafter also be referred to as polyketones.

The crosslinking process of the present invention has the advantage that crosslinked, clear and white resins are obtained while no curing agent needs to be mixed with the derivatives of the polyketones. During crosslinking, less than 0.1 mole of curing agent per mole of derivative can be present, while still obtaining sufficiently crosslinked resins. Preferably, at most 0.05 mole of curing agent is present, more preferably at most 0.01 mole. Most preferably, crosslinking is carried out without curing agent added. The molar amount of derivative present is calculated with the help of the number average molecular weight as determined according to ASTM D 3536-91.

If the crosslinking is carried out by heating the derivatives of the polyketones, the polyketones are heated to a temperature of between 100° and 300° C., preferably of between 110° and 250° C., more preferably of between 115° and 200° C. The crosslinking time preferably is between 0.01 and 30 hours, more preferably between 0.1 and 20 hours.

If the crosslinking is carried out by subjecting the derivative of the polyketone to ultraviolet light, the crosslinking can be carried out with lamps having an intensity of between 20 and 500 W.cm$^{-1}$, preferably between 50 and 300 W.cm$^{-1}$, for between 0.001 and 100 s, preferably between 0.01 and 10 s, most preferably between 0.01 and 5 s. Lamps which are useful are medium pressure mercury vapor lamps.

If the crosslinking is carried out with the help of an electron beam, the crosslinking is preferably carried out with the help of electron beam accelerators of between 50 and 500 keV, preferably between 100 and 400 keV, with which electron beam the derivative is contacted for between 0.001 and 100 s, preferably between 0.01 and 10 s, most preferably 0.01 and 5 s.

The present invention can be used in a wide field of applications. It is especially advantageous for preparing coatings and for joining wood particles. In the latter case, the process preferably comprises crosslinking the derivative present in a mixture of wood particles and derivative, which derivative and crosslinking are as described above.

It has been found that the crosslinking time and/or temperature can be reduced by the presence of a compound which acts as a catalyst. Useful catalytic compounds have been found to be acidic compounds, i.e. compounds having a pKa of below 7, or precursors of such acidic compounds. Preferably, the crosslinking process is carried out in the presence of an acidic compound or a precursor of an acidic compound. More preferably, compounds are used having a pKa of below 6, more preferably below 5. The pKa is to be measured in an aqueous solution at 25° C. Specific acidic compounds which can be used are salicylic acid and para-toluene sulfonic acid. Preferably, the acidic compound is para-toluene sulfonic acid. A catalyst differs from a curing agent in that a relatively small amount already gives good results. A relatively small amount can be defined as less than 0.10 mole, preferably at most 0.08 mole, more preferably between 0.005 and 0.08 mole of catalytic compound per mole of derivative. Although relatively small amounts already give good results, it will in general not be detrimental to the product to have a larger amount of catalytic compound present.

The linear alternating copolymers for use in the present invention comprise repeating units of the formula —(—CO—G—), in which G stands for a unit derived from an olefinically unsaturated compound. Therefore, the copolymer contains substantially one molecule of carbon monoxide for each molecule of olefinically unsaturated compound. One or more olefinically unsaturated compounds can be present. If more than one olefinically unsaturated compound is present, the units derived from the different compounds will be present at random in the polymer. Preferred polyketone polymers are copolymers in which G is based on ethene, propene, butene, octene, styrene and/or acrylate esters. Preferably, G is based on propene. The end groups of the polymer chain will depend upon what materials are present during the production of the polymer and whether and how the polymer is purified. The precise physical properties of the polymers are thought not to depend upon the particular end group to any considerably extent.

The linear alternating copolymer of carbon monoxide and one or more olefinically unsaturated compounds having a ratio of weight average molecular weight to number average molecular weight of more than 1 can be obtained in any way known to be suitable to someone skilled in the art. A useful preparation method basically comprises contacting the carbon monoxide and hydrocarbon in the presence of a catalyst composition formed from a palladium compound, the anion of a non-hydrohalogenic acid and a bidentate ligand of phosphorus. Other useful preparation methods and process features which can be applied have been described in EP-A-181014 and EP-A-121965, both incorporated herein by reference. A polyketone of preferred viscosity is obtained by carrying out the preparation process at relatively high temperature. Useful polyketone starting compounds have been described in EP-A-032602, incorporated herein by reference.

The polyketones have a ratio of weight average molecular weight to number average molecular weight of more than 1 in order to ensure their handlability. Preferably, the polyketones have a ratio of between more than 1 and 20, more preferably of between 1.1 and 5, most preferably between 1.5 and 3. The handlability of the linear alternating polymers is further closely related to their viscosity. The viscosity is closely related to the molecular weight of the polyketones. Polyketones of low molecular weight are usually liquid or viscous, which means that they can easily be used as a coating of an adhesive. Therefore, although a large range of molecular weights can be used in the present invention, preferably the weight average molecular weight of the thermoplastic polymer is at most 200,000 daltons, especially between 200 and 20,000 daltons, and in particular between 200 and 10,000 daltons, measured with the help of gel permeation chromatography (GPC) as described in ASTM D 3536–91.

The derivatives of polyketones of the present invention can be obtained by treating the polyketones with formaldehyde and/or with a precursor of formaldehyde. Useful precursors have been found to be dihydroxymethylene (also called formaline), trioxane and para-formaldehyde. Preferably, a precursor of formaldehyde is applied in treating the polyketone, more preferably paraformaldehyde.

A useful process for treating the linear alternating copolymer with formaldehyde and/or a precursor of formaldehyde comprises treating the linear alternating copolymer of carbon monoxide and one or more olefinically unsaturated compounds with formaldehyde and/or a precursor of formaldehyde at a pH of more than 7, preferably more than 10, at a temperature of between 5° and 150° C., preferably between 20° and 90° C. for between 0.5 and 10 hours. A useful molar ratio of formaldehyde and/or a precursor of formaldehyde to ketone unit present in the polyketone has been found to be between 0.01 and 4. The useful pH of the aqueous solution can be obtained by adding a hydroxide or oxide of an alkali of alkaline earth metal to the solution.

The present invention also relates to clear and white thermoset resins obtainable by treating the polyketone with formaldehyde and/or a precursor of formaldehyde and subsequently crosslinking the treated copolymer in the presence of less than 0.1 mole of curing agent per mole of derivative. The color and clarity of the resin is to be measured according to the test method described in ASTM D 1925–70. A preferred product has a yellowness index of less than 20, preferably of between 0 and 10, more preferably between 1 and 7.

Preferred thermoset resins according to the present invention have a relatively high hardness and are not easily dissolved in methylethylketone (MEK). The latter indicates that the copolymer has been highly crosslinked. This makes the resin highly resistant against dissolution. The hardness was measured as described in ASTM method D 4366–92. It was found that resins could be prepared having a hardness of at least Königs hardness 150 s. Further, resins were prepared having such MEK resistance that the coating obtained could withstand at least 100 rubs of a wad soaked in MEK, which MEK resistance was measured according to ASTM D 4752–87. The present invention also relates to thermoset resins obtainable by treating the polyketone with formaldehyde and/or a precursor of formaldehyde and subsequently crosslinking in the presence of less than 0.10 mole of curing agent per mole of derivative, which thermoset resins have a hardness of at least 150 s. Königs hardness, and are able to withstand at least 100 rubs of a wad soaked in MEK.

The thermoset resins of the present invention can be used for many purposes. The resins are thought to be especially useful for preparing coatings and for use as wood adhesives. The present invention also relates to coatings based on a thermoset resin as described above.

EXAMPLE

Preparation of copolymer

A linear alternating carbon monoxide/propene copolymer was prepared as follows. A 100 l reactor was charged with 30 l methanol. Propene was added at a pressure of 28 bar. The reactor content was heated to 80° C. and pressurized with CO to a partial pressure of 21 bar. Subsequently the catalyst solution was injected. The catalyst solution was prepared by mixing 2.1 g of Pd(II) acetate, 3.7 g of 1,4-bis-(di-butylphosphino)-butane, 3.7 g of paratoluene sulfonic acid and 1.55 ml pyridine with 250 ml of 2-propanone. During reaction, the pressure was maintained at 47 bar by adding CO. After about 24 hours, the CO addition was stopped, the reactor content was cooled to 40° C. and an anti-oxidant in dimethylketone was added. The mixture was stirred for another 2 hours, and the polymer was separated off. The polymer obtained had a ratio of weight average molecular weight to number average molecular weight of more than 1.

Preparation of derivative 10 gram of copolymer was treated with 4.2 gram of paraformaldehyde in the presence of 50 ml of tetrahydrofuran. 20 ml NaOH in water was added (1 mol/l). The mixture was kept at 45° C. for 20 hours. The derivative of the copolymer was separated off.

Crosslinking

The derivative was mixed with p-toluene sulfonic acid (1% wt), and was cured at 150° C. during 1 hour. A clear and colorless product was obtained. The hardness of the product was measured as described in ASTM method D 4366–92, and was found to have a Königs hardness of 222 s. Further, the MEK resistance was measured as described in ASTM D 4752–87, and found to be more than 100 rubs.

I claim:

1. A process comprising the steps of:
   crosslinking a derivative present in a mixture of wood particles and derivative, which derivative is a derivative of a linear alternating copolymer of carbon monoxide and one or more olefinically unsaturated compounds, which copolymer has a ratio of weight average molecular weight to number average molecular weight of more than 1 and which derivative is obtained by treating the linear alternating copolymer with formaldehyde and/or a precursor of formaldehyde, which crosslinking is carried out by crosslinking a derivative of a linear alternating copolymer of carbon monoxide and one or more olefinically unsaturated compounds, which copolymer has a ratio of weight average molecular weight to number average molecular weight of more than 1, and, which crosslinking process is carried out in the presence of less than 0.1 mole of curing agent per mole of derivative.

2. The process of claim 1, in which process the derivative is crosslinked by heating the derivative to a temperature of between 100° and 300° C. for between 0.001 and 30 hours, and/or subjecting the derivative to ultraviolet light, and/or subjecting the derivative to an electron beam.

3. The process of claim 2 wherein the derivative is crosslinked by heating to a temperature of between 110° and 250° C. for between 0.01 and 30 hours.

4. The process of claim 1, in which the crosslinking is carried out in the presence of an acidic compound or a precursor of an acidic compound.

5. The process of claim 1, in which the crosslinking is carried out in the presence of at most 0.05 mole of curing agent per mole of polymer.

* * * * *